Figure 1:
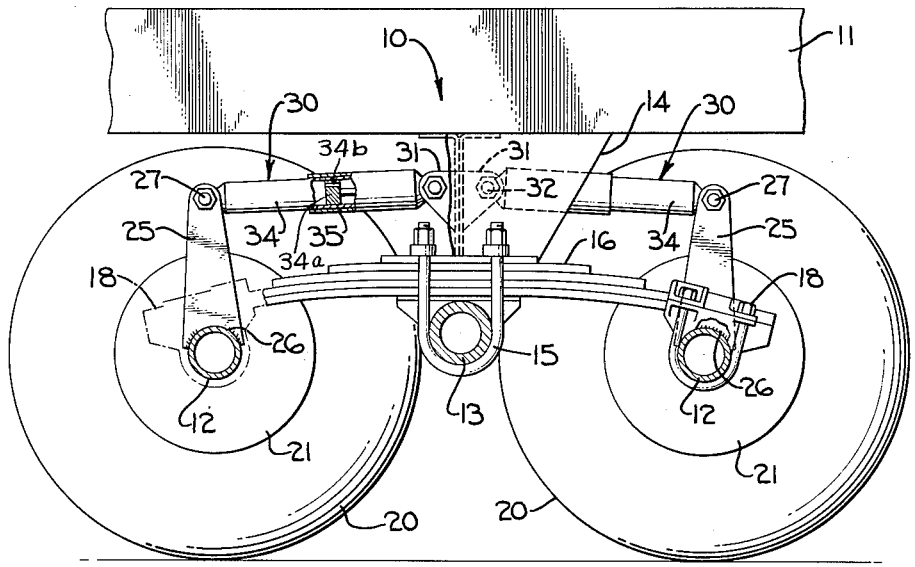

Aug. 3, 1965  H. C. HARBERS  3,198,542
SPRING SUSPENSION ASSEMBLY WITH BRAKE HOP CONTROL
Filed June 28, 1963

HENRY C. HARBERS.
INVENTOR.

BY
ATTORNEY.

United States Patent Office 3,198,542
Patented Aug. 3, 1965

1

3,198,542
SPRING SUSPENSION ASSEMBLY WITH BRAKE HOP CONTROL
Henry C. Harbers, Pasadena, Calif., assignor to Western Unit Corporation, City of Industry, Calif., a corporation of California
Filed June 28, 1963, Ser. No. 291,327
6 Claims. (Cl. 280—104.5)

This invention relates to spring suspension assemblies for power propelled vehicles and more particularly to an improved assembly of this type incorporating simple, rugged and highly effective brake hopping control means of unique character.

It is well known that much difficulty is experienced with many vehicles in that the carriage wheels are subject to a phenomenon known as "brake hopping" in that they have a tendency to oscillate in a vertical plane toward and away from the roadway during application of the brakes. This not only greatly reduces the efficiency of braking but is highly objectionable for numerous reasons well known to persons experienced in this art.

Many proposals have been made by numerous designers in attempts to provide linkages and various devices having as their purpose arresting or minimizing this tendency of the wheels to hop in response to application of the brakes. Most of these devices involve linkages so designed and arranged as to minimize vertical movement of the wheels accompanied by tendency of the carriage axle to rotate as they do during application of the brakes. These various systems vary in complexity and type as well as in their degree of effectiveness in restricting brake hopping and each is subject to one or more serious shortcomings sought to be obviated by the present invention.

By this invention there is provided unusually simple highly effective and novel automatic hop control functioning in accordance with a new principle found to be eminently satisfactory for a wide range of applications on both light duty and heavy duty vehicles. The invention utilizes a hop control having as its essential component means selectively responsive to load impulses of differing frequencies and so designed and arranged as to permit the vehicle springs to cushion load impulses of low frequencies characteristic of normal travel over rough roadways, but being substantially rigid and non-responsive to higher frequency load impulses characteristic of brake hopping conditions. Thus it has been found that even rapid travel over very rough roads imposes vertical movement or load impulses at a lower frequency than that characteristic of brake hopping conditions. This characteristic difference makes it eminently feasible to employ shock absorber means selectively designed to respond to low frequency but not to high frequency load impulses to control and prevent brake hopping in a simple and highly effective manner.

An hydraulic type shock absorber is particularly suitable for use in controlling brake hopping and, for this purpose, is equipped with a bleed orifice providing the selective and differential operating characteristics desired to control brake hopping. Such shock absorbers are desirably arranged generally parallel to the roadway with one end connected to a stationary part of the vehicle frame and the other end connected to the axle to be controlled. So long as the wheel is operating over rough roads and oscillating at a relatively slow rate in a vertical plane, the shock absorber responds readily and permits the usual carriage spring to respond to this movement. However if the brakes are applied and the wheel tends to oscillate rapidly in a vertical plane as it has a tendency to do, the bleed port is ineffective to pass the liquid between the opposite ends of the shock absorber with the result that the shock absorber becomes a rigid link positively preventing vertical movement of the braked wheel and brake hopping is positively arrested.

Accordingly it is a primary object of the present invention to provide an improved spring suspension assembly for vehicles having new and improved means for positively preventing brake hopping without however interfering with the normal operation of the vehicle springs when the brakes are relaxed.

Another object of the invention is to provide an improved wheel suspension assembly incorporating novel brake control means.

Another object of the invention is the provision of a wheel suspension assembly having brake hop sensing means automatically responsive to brake hopping conditions and effective to arrest movement of the wheels away from the roadway so long as the brakes are applied.

Another object of the invention is the provision of an improved tandem suspension assembly incorporating anti-brake hopping means leaving the normal springs free to operate under low frequency load impulses and rendering the vehicle springs substantially ineffective at higher load impulse frequencies characteristic of brake hopping.

Another object of the invention is the provision of a tandem wheel suspension assembly incorporating hydraulic shock absorbers so arranged and constructed as to arrest vertical movement of the wheels away from the roadway during application of the brakes but leaving the wheels free to move relative to the frame while passing over rough ground with the brakes relaxed.

These and other more specific objects will appear upon reading the following specification and claims and upon considering in connection therewith the attached drawing to which they relate.

Figure 2:
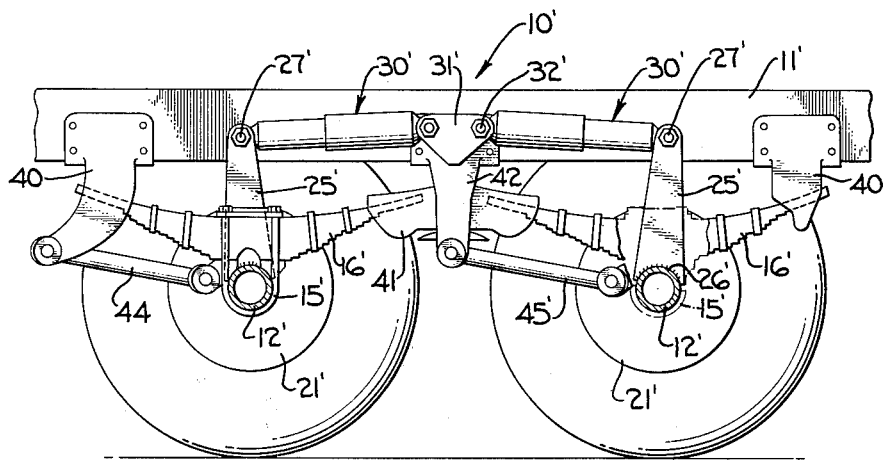

Referring now to the drawing in which a preferred embodiment of the invention is illustrated:

FIGURE 1 is a side elevational view showing one preferred illustrative embodiment of the invention; and FIGURE 2 is a similar view of a second illustrative embodiment of the invention.

Referring more particularly to FIGURE 1 there is shown a first preferred embodiment of the invention spring suspension assembly designated generally 10 and supporting one end of main frame 11 of a motor vehicle. This assembly comprises a pair of tandem wheel carriages having axles 12, 12 arranged parallel to one another and to an intervening transverse tube 13 having its opposite ends secured to frame 11 by way of hanger brackets 14. Firmly anchored to the opposite ends of tube 13 by U-bolt clamps 15 are similar spring beams 16. The opposite ends of these beams are clamped to carriage axles 12, 12 by any suitable coupling means 18. Desirably couplings 18 include internal rubber pad members inserted between the ends of the spring beams and the clamping pads of the couplings proper in accordance with standard practice well known to those skilled in this art.

Secured to the outer ends of axles 12, 12 are the usual pneumatically tired wheels 20, 20 each equipped with any conventional type of braking equipment including a brake drum 21. It will be understood that the particular brake design and the equipment for operating them are not in and of themselves a feature of the invention.

The anti-brake hopping equipment for the described wheel suspension assembly includes an upright rigid arm 25 secured, as by welding 26, to each carriage axle 12 closely beside spring beam coupling 18. Pivotally connected to the upper ends of each arm, as by bolts 27, are separate shock absorbers 30, 30. These shock absorbers may be of any suitable character having the operating characteristics essential for the practice of the present invention and are arranged horizontally and generally parallel to the roadway with their ends remote from the axles pivotally connected to a stationary part of the vehicle, as brackets 31 secured to hanger bracket 14. Shouldered bolts 32 serve to provide the desired pivotal connection between the brackets and the shock absorbers.

As here shown by way of example, shock absorbers 30 are of the hydraulic type having two cylinders 34, 35 telescoped together and each charged with fluid. The inner end of cylinder 34 is provided with a partition or piston head 34a having a fluid tight sliding connection with the interior side wall of cylinder 35 and separating the fluid charge into two interconnected bodies. As is well known, hydraulic shock absorbers of this type have a calibrated orifice 34b through the piston head providing restricted communication for the passage of fluid between the two bodies thereof and contained respectively in cylinders 34 and 35. The size of the calibrated orifice determines the rate at which the shock absorber can be collapsed or extended. The details of this orifice and of the internal construction of the shock absorbers is not shown since it is well known to persons experienced in the shock absorber art.

It will be understood that the size of the orifice through the shock absorber pistons governs the rate at which the shock absorbers can be collapsed and extended. In other words, by selecting the appropriate orifice size in relation to the charge of hydraulic fluid in the shock absorbers the response rate of the shock absorber can be controlled such that the shock absorber will permit the spring beam to flex readily and in the usual manner as the vehicle passes over a rough roadway at all normal operating speeds but will not permit the spring to flex and will hold it inflexible and substantially rigid at all higher load impulse frequencies.

Desiraby there is a separate shock absorber 30 for each end of each axle to be controlled and subject to brake hopping. As will be recognized, hop control devices 30 are automatically self adjusting in that tolerance variations and other discrepancies commonly occurring between the components of different vehicles are readily accommodated since cylinders 34, 35 readily assume an appropriate neutral position with one end secured to rigid arm 25 and the other end to bracket 31. If the forward or left-hand wheel, as viewed in FIGURE 1, falls into a depression in the roadway surface the forward end of spring beam 16 flexes downwardly causing elongation of the associated overlying shock absorber 30. This change in length normally occurs relatively slowly as the fluid in tube 34 passes through the orifice at the rear end of this tube and then into larger tube 35. The reverse action would normally occur in the other shock absorber owing to the tendency of the rear end of the spring to flex upwardly when the forward end flexes downwardly.

If the brakes are applied to the wheels, axles 12, 12 tend to rotate with the wheels due to the gripping action of the brake shoes on brake drums 21. This sharp impulse tending to rotate the axles tends to elongate the forward shock absorber and to contract the rear shock absorber. It is well known that application of the brakes is likely to cause the carriage wheels to oscillate up and toward and away from the roadway at a relatively high frequency compared to the load impulse frequency resulting from travel over rough roads. The shock absorbers of this invention immediately sense this rapid oscillation strongly and positively resist change in length and provide a rigid parallelogram linkage comprising bracket 14, rigid arm 25, spring beam 16 and shock absorber 30. So long as the brakes are applied this rigid parallelogram linkage prevents brake hopping and assures even, uniform and efficient braking action with all wheels sharing the load and the traction forces. Immediately that the brakes are released the shock absorbers are free to respond instantly to low frequency load impulses characteristic of rough roadways.

Referring now to the second preferred embodiment illustrated in FIGURE 2, it will be understood that the same reference characters are applied wherever appropriate to represent the same or similar components appearing in FIGURE 1 but are distinguished therefrom by the application of a prime mark. The principal difference in the second embodiment resides in the fact that spring beams 16′, 16′ have their midportions anchored to axles 12′ by U-clips 15′. The remote ends of these spring beams on either side of the vehicle bear against hanger brackets 40, 40 and their adjacent ends bearing against an equalizing beam 41, having its midportion pivotally cradled in a bracket 42 rigidly secured to frame 11′.

Owing to the described floating arrangement of the spring beams relative to the vehicle frame it is necessary to provide draft link connections between the carriage axles and the hanger brackets. To this end the forward carriage axle is secured to forward bracket 40 by a draft link 44 and rear axle 12′ is connected to center hanger bracket 42 by a draft link 45.

The shock absorbers and anti-brake hopping mechanisms 30′, 30′ have their adjacent ends pivotally connected to bracket 31′ whereas their remote ends are pivotally connected to rigid arms 25′, 25′ welded to the carriage axles.

The alternate embodiment functions to arrest brake hopping in substantially the same manner described above in connection with FIGURE 1. Application of the brakes causes each of the carriage axles to rotate counterclockwise (assuming the vehicle to be traveling towards the left) with the result that the spring beams pivot with the axle causing equalizer 41 to pivot clockwise about its pivot support in hanger 42.

This tendency of the axles to rotate along with the attached spring beams induces and promotes brake hopping which is instantly arrested by shock absorbers 30′, 30′ due to the high frequency of the hopping action. As explained in detail above the inability of the shock absorbers to follow the rapidity of brake hopping converts them into rigid links cooperating with the respective draft links 44, 45 to prevent brake hopping.

In view of the foregoing detailed description of two representative embodiments of the present unique mode of arresting brake hopping, it is believed a full understanding will be had respecting the principles of this invention and the versatility and suitability thereof for controlling brake hopping in association with a wide range of spring suspension assembiles. Accordingly it will be understood that the invention contemplates protection of the principles of the invention irrespective of the type of spring suspension employed, or whether applied to light or heavy duty vehicles and including passenger vehicles of all kinds.

While the particular spring suspension assembly with brake hop control herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:
1. A vehicle spring suspension assembly having effective provision for counteracting tendency of the carriage wheels to hop while the brakes are applied, said assembly comprising at least one wheeled carriage connected with a vehicle frame through spring means, said wheels having braking means therefor, and means for resisting tendency of said wheels to bounce toward and away from the roadway during application of said wheel braking means and comprising hydraulic shock absorber means of variable length supported lengthwise of the vehicle frame and having an orifice sized to pass hydraulic fluid at a rate varying with the pressure load thereon, said shock absorber means having one end rigidly connected to a stationary part of the vehicle and its opposite end connected with the carriage axle, said shock absorber means and said orifice being constructed and arranged so that said shock absorber means operates to change length in response to low frequency variable load impulses imposed thereon and characteristic of vehicle travel over bumps but is highly resistant to change in length when subjected to relatively high frequency variable load impulses characteristic of brake hopping conditions during application of the wheel brakes.

2. A spring suspension assembly for a power propelled road vehicle of the type having a chassis including at least one brake-equipped wheeled carriage unit, spring means interposed between the vehicle frame and each end of said carriage unit and arranged to permit limited up-and-down as well as limited rotary movement of the carriage axle during movement of the vehicle over the ground and during braking of said wheels, hydraulic shock absorber means of variable length supported with its axis generally horizontal and having one end connected to an arm rigidly supported by said carriage axle, said shock absorber means having an orifice sized to pass the hydraulic fluid charge of said shock absorber means with minimum interference and delay and operating to change in length in response to low frequency load impulses characteristic of vehicle travel over bumpy roads but being incapable of passing any substantial quantity of fluid in response to higher frequency load impulses characteristic of brake hopping occurring during application of the vehicle brakes whereby said carriage axle is prevented from hopping toward and away from the roadway while the brakes are being applied.

3. A spring suspension assembly as defined in claim 2 characterized in the provision of a pair of wheeled carriages arranged in closely-coupled tandem and in that said spring means is operatively coupled between said pair of carriage means along either side of the vehicle frame, said assembly being further characterized in that a separate one of said horizontally disposed hydraulic shock absorber means is disposed between each end of said carriage axles and a stationary portion of the vehicle.

4. In combination, a power-propelled road vehicle having a main frame supported by a tandem spring suspension assembly, said assembly including a pair of carriages having parallel axles extending crosswise of said frame and provided at their ends with brake-equipped wheels, spring means interconnecting each axle end and said frame and including draft transmitting means, rigid arm means projecting radially from each axle end, hydraulic shock absorber means having one end movably connected to said frame and its other end movably connected to the outer ends of said arms and lying generally parallel to the roadway, said hydraulic shock absorber means being charged with hydraulic fluid and having an orifice located in the path of fluid flow as said shock absorber means starts to change in length, said orifice having a size so proportioned to the fluid flow rates therethrough under low frequency load impulses as to provide desired shock absorbing action but less than that required to provide substantially all shock absorbing action under the relatively high frequency load impulses characteristic of brake hopping occurring when said wheels are braked.

5. In a vehicle resilient suspension assembly of the type having a brake-equipped wheeled carriage resiliently coupled to a vehicle frame, that improvement for arresting brake hopping without interfering with the resilient operation of the suspension assembly when the brakes are released which improvement comprises, a rigid arm projecting radially from the carriage axle, hydraulic shock absorber means having its opposite ends pivotally connected respectively to the outer end of said rigid arm and to said vehicle frame, said shock absorber means being responsive to relatively low load impulse frequencies normally encountered in the use of said vehicle with the brakes retracted and providing normal shock absorbing action under the aforesaid normal use conditions but having a maximum load impulse frequency response below the relatively higher load impulse frequency characteristic of brake hopping resulting from application of the vehicle brakes whereby said resilient suspension is inoperative to respond to impulse frequencies occurring after application of the vehicle brakes and caused by brake hopping.

6. In combination, a vehicle frame, a spring suspension assembly rigidly connected to said frame comprising a pair of brake-equipped carriage axle units arranged in tandem and including a draft transmitting connection between the end portions of each axle and said vehicle frame, hydraulic shock absorber means confined to one vertical side of said draft connections and offset vertically therefrom and lying generally parallel thereto, said hydraulic absorber means being charged with hydraulic fluid and including orifice means providing a rate of operation selectively responsive to load impulse frequencies below those characteristic of brake hopping and substantially nonresponsive to load impulse frequencies characteristic of brake hopping resulting from application of the brakes while the vehicle is traveling, whereby said shock absorber means changes length in a normal manner and supplements the resilient action of said spring suspension assembly under normal traveling conditions and which strongly resists operation of said shock absorber means when subjected to load impulse frequencies characteristic of brake hopping upon application of the carriage brakes.

References Cited by the Examiner

UNITED STATES PATENTS 2,520,778  8/50  Page _____ 280—104.5
3,108,822  10/63  Tantlinger _____ 280—104.5

MILTON BUCHLER, *Primary Examiner.*

A. HARRY LEVY, *Examiner.*